(12) United States Patent
Basavanhally et al.

(10) Patent No.: US 7,062,132 B2
(45) Date of Patent: Jun. 13, 2006

(54) COUPLER ASSEMBLY FOR AN OPTICAL BACKPLANE SYSTEM

(75) Inventors: Nagesh R. Basavanhally, Skillman, NJ (US); David A. Ramsey, Annandale, NJ (US); Hong Tang, Belle Mead, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 187 days.

(21) Appl. No.: 10/743,922

(22) Filed: Dec. 23, 2003

(65) Prior Publication Data

US 2005/0135742 A1 Jun. 23, 2005

(51) Int. Cl.
G02B 6/26 (2006.01)
G02B 6/42 (2006.01)

(52) U.S. Cl. .................. 385/52; 385/15; 385/24; 385/25

(58) Field of Classification Search ............ 385/15, 385/24, 25, 52
See application file for complete search history.

(56) References Cited

U.S. PATENT DOCUMENTS

| 5,218,654 | A | 6/1993 | Sauter ................. 385/24 |
| 6,005,991 | A | 12/1999 | Knasel ................. 385/14 |
| 6,259,840 | B1 | 7/2001 | Munoz-Bustamante et al. . 385/39 |
| 6,532,317 | B1 | 3/2003 | Hanneman, Jr. ........... 385/14 |
| 6,623,177 | B1 * | 9/2003 | Chilton ................. 385/88 |
| 6,823,101 | B1 * | 11/2004 | Gates et al. ............. 385/19 |
| 6,839,476 | B1 * | 1/2005 | Kim et al. .............. 385/14 |
| 2002/0154376 | A1 | 10/2002 | Vail et al. .............. 359/238 |

OTHER PUBLICATIONS

M. Rode et al, "Novel Optical Backplane Board-To-Board Interconnection". 11th International Conference on Integrated Optics and Optical Fibre Communications/23rd European Conference on Optical Communications, vol. 3, No. 448, Sep. 1997, pp. 228-231.*

"A High-Performance Hybrid Electrical-Optical Interconnection Technology for High-Speed Electronic Systems," by Elmar Griese, 1521-3323/2002 IEEE, IEEE Transactions of Advanced Packaging, vol. 24, No. 3, Aug. 2001, pp. 375-383.

"Novel Optical Backplane Board-To-Board Interconnection" by M. Rode et al., 11th International Conference on Integrated Optics and Optical Fibre Communications/ 23rd European Conference on Optical Communications,vol. 3, No. 448, Sep. 1997, pp. 228-231.

* cited by examiner

Primary Examiner—Frank G. Font
Assistant Examiner—Derek L. Dupuis

(57) ABSTRACT

A coupler assembly for an optical backplane system having a backplane and two or more circuit packs connected to that backplane. Each circuit pack has an optical transceiver and the backplane has an optical pipe (e.g., an array of waveguides) adapted to guide optical signals between the transceivers of different circuit packs. A coupler assembly is provided for each transceiver to couple light between that transceiver and the optical pipe. Advantageously, the coupler assembly has a movable optical element that can accommodate possible misalignment between the backplane and the circuit pack. In one embodiment, the movable optical element is an array of MEMS mirrors, each mirror adapted to direct light between an optical transmitter or receiver and the corresponding waveguide of the optical pipe. In another embodiment, the movable optical element is an array of flexible optical fibers, each coupled between an optical transmitter or receiver and the corresponding waveguide of the optical pipe and having an angled surface adapted to couple light between said fiber and waveguide.

8 Claims, 6 Drawing Sheets

COUPLER ASSEMBLY FOR AN OPTICAL BACKPLANE SYSTEM

BACKGROUND OF THE INVENTION

1. Field of the Invention

The present invention relates to optical circuits and, more specifically, to printed circuit board assemblies having optical circuit components.

2. Description of the Related Art

A modern telecommunications or computer system typically has a number of printed circuit boards (PCBs) or cards, which plug into a backplane or motherboard. The backplane generally provides power to the PCBs and a pathway by which the PCBs communicate with each other. For most backplanes, an electrical bus, which is typically a series of wires, is a primary means by which the communication between the PCBs takes place. Electrical transmission characteristics of the bus are defined by its material properties, the physical layout of the components, the clock speed of the signals, etc. As complexity of telecommunications and computer systems increases, signals within backplanes are driven at increased clock speeds. However, at relatively high clock speeds (e.g., over 1 GHz), the performance of electrical buses may become unsatisfactory due to dispersion, crosstalk, and emission of and susceptibility to electromagnetic radiation.

To overcome this problem, backplane systems in which signals are transmitted through backplanes via both electrical and optical buses have been proposed. For example, one such backplane system is disclosed in U.S. Pat. No. 6,005,991, the teachings of which are incorporated herein by reference. However, one problem with optical backplane systems is that relatively accurate alignment is required to properly couple light between the backplane and the PCBs plugged into that backplane. For example, an optical bus of the backplane has to be sufficiently well aligned with the corresponding optical pathways and/or optical devices of the PCBs to provide reliable operation when the system is subjected to mechanical vibrations and/or temperature-induced deformations. In addition, backplane and PCB manufacturing tolerances that are typically less stringent than the required backplane/PCB alignment precision have to be appropriately accommodated.

SUMMARY OF THE INVENTION

Problems in the prior art are addressed, in accordance with the principles of the present invention, by a coupler assembly adapted to optically couple a circuit pack to a backplane in an optical backplane system, which can accommodate possible misalignment between the circuit pack and the backplane and is adapted to correct (1) initial misalignment typically present when the circuit pack is first connected to the backplane and (2) without further intervention from an operator, subsequent misalignment typically caused by mechanical vibrations and/or temperature-induced deformations. To this end, the coupler assembly may employ a movable optical element that can automatically track changes in the relative position of the backplane and the circuit pack to maintain good optical coupling. In one embodiment, the movable optical element is an array of MEMS mirrors, each mirror adapted to direct light between an optical transmitter or receiver of the circuit pack and a corresponding waveguide of the optical pipe in the backplane. In another embodiment, the movable optical element is an array of flexible optical fibers, each coupled between an optical transmitter or receiver and a corresponding waveguide of the optical pipe. One end of each fiber is fixedly connected to the optical pipe and has an angled surface adapted to direct light between the fiber and waveguide. The other end of the fiber is fixedly connected to the optical transmitter/receiver such that the fiber flexibility permits relative orientation of the circuit pack and the backplane to be perturbed without deterioration in the optical coupling.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
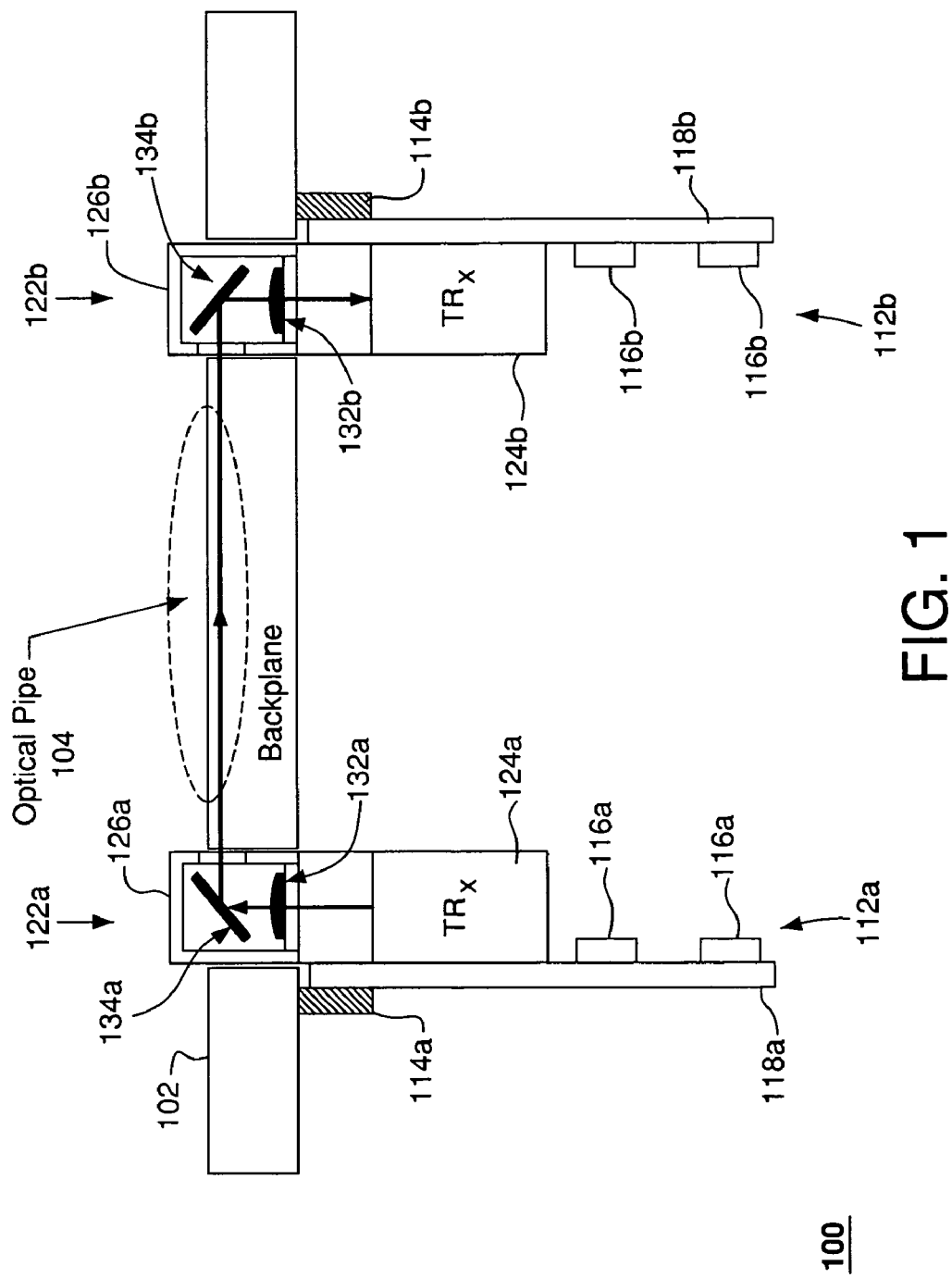
FIG. 1 shows a cross-sectional view of a backplane/circuit-pack assembly according to one embodiment of the present invention.

FIG. 1 shows a cross-sectional view of a backplane/circuit-pack assembly 100 according to one embodiment of the present invention. Assembly 100 has a backplane 102 having an optical pipe 104 adapted to transmit optical signals through the backplane. In one embodiment, backplane 102 is a printed circuit board having an integrated array of optical waveguides that forms optical pipe 104 similar to the optical waveguides described in an article by E. Griese, "A High-Performance Hybrid Electrical-Optical Interconnection Technology for High-Speed Electronic Systems," published in IEEE Transactions on Advanced Packaging, 2001, Vol. 24, No. 3, p. 375, the teachings of which are incorporated herein by reference.

Backplane 102 supports two circuit packs 112a–b, each connected to the backplane using a corresponding connector 114. Each circuit pack 112 has a PCB 118 with circuit elements 116, wherein connector 114 provides power and electrical connections to the circuit elements and, depending on the implementation, may fix the circuit pack in place on backplane 102. To transmit and receive optical signals through optical pipe 104, each circuit pack 112 has a transceiver package 122 comprising an optical transceiver 124 and a coupler assembly 126. Each transceiver 124 has (i) one or more optical transmitters adapted to convert electrical signals into the corresponding optical signals for transmission through backplane 102 and (ii) one or more optical receivers (e.g., photo-detectors) adapted to transform optical signals received via backplane 102 into the corresponding electrical signals. Each coupler assembly 126 is inserted into an opening in backplane 102 and serves to optically couple corresponding transceiver 124 to optical pipe 104. For each optical transmitter of the corresponding transceiver 124, coupler assembly 126 has a lens 132 and a movable mirror 134. Similarly, for each optical receiver of that transceiver, coupler assembly 126 also has a lens 132 and a movable mirror 134. Each lens 132 is adapted to either collimate light emitted from transceiver 124 or focus light entering that transceiver. Similarly, each mirror 134 is adapted to either couple the collimated light into a corresponding waveguide of optical pipe 104 or direct light from a waveguide of the optical pipe through lens 132 to the corresponding receiver of transceiver 124. In FIG. 1, transceiver packages 122a and 122b are illustratively shown as emitting and receiving light, respectively. One skilled in the art will appreciate that, using its different mirrors 134, each transceiver package 122 may simultaneously transmit and receive optical signals.

When each circuit pack 112 is first mounted on backplane 102, the tilt angle of each mirror 134 is adjusted to obtain efficient optical coupling of receivers and transmitters of corresponding transceiver 124 to the corresponding waveguides of optical pipe 104. More specifically, using control signals from a mirror controller (not shown), each mirror 134 sweeps through a range of tilt angles until optical interconnection is established. Then, the tilt angle is fine-tuned to optimize that connection. After the initial alignment, each transceiver package 122 may be configured to monitor the interconnection quality and to dynamically adjust the tilt angles of mirrors 134 to correct for possible misalignment caused by mechanical vibrations and/or temperature variations. Advantageously, due to the use of movable mirrors 134 in transceiver packages 122, circuit packs 112 are relatively easy to couple to optical pipe 104 of backplane 102. In addition, good optical coupling can be dynamically maintained during operation of assembly 100.

Figure 2A:
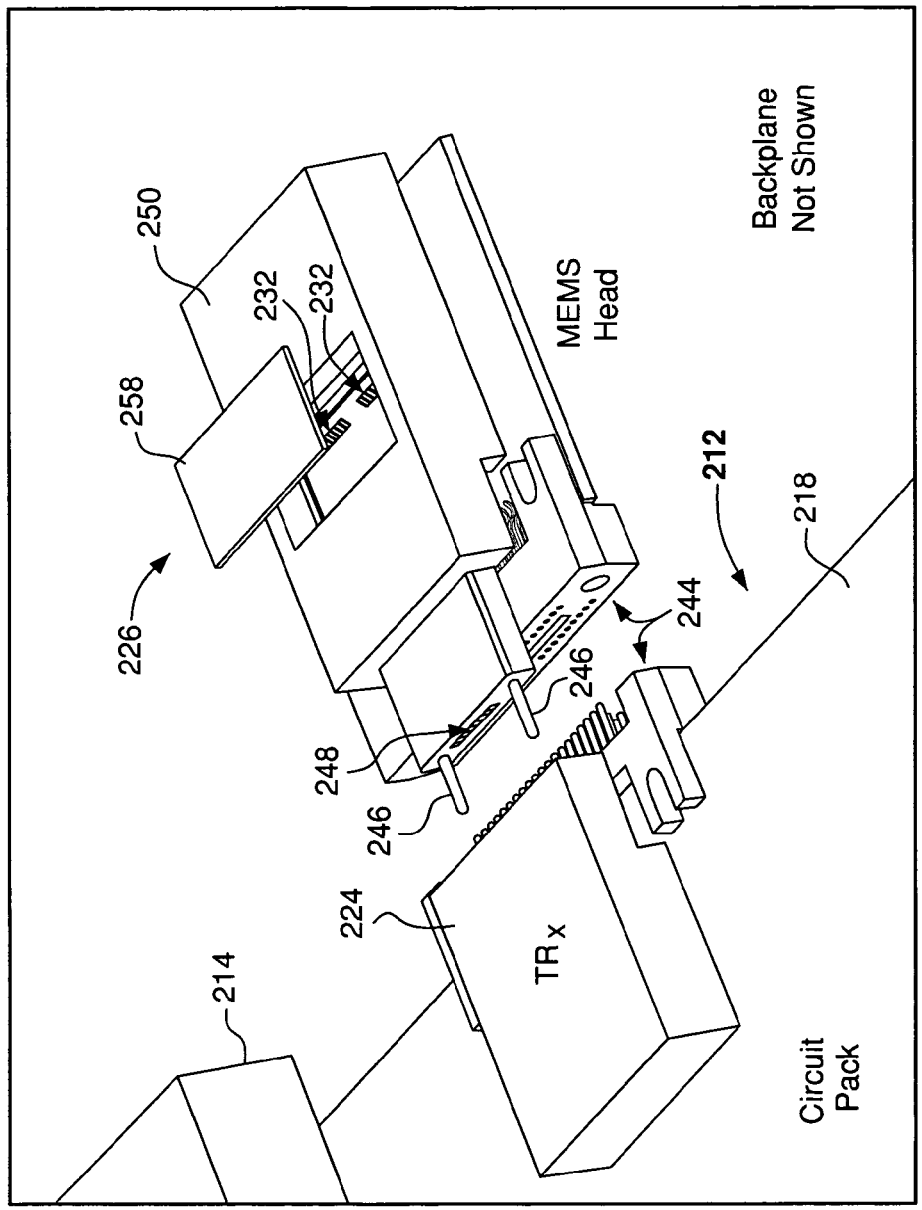
FIGS. 2A–B show three-dimensional perspective views of a circuit pack and a coupler assembly that can be used in the backplane/circuit-pack assembly of FIG. 1 according to one embodiment of the present invention.
Figure 2B:
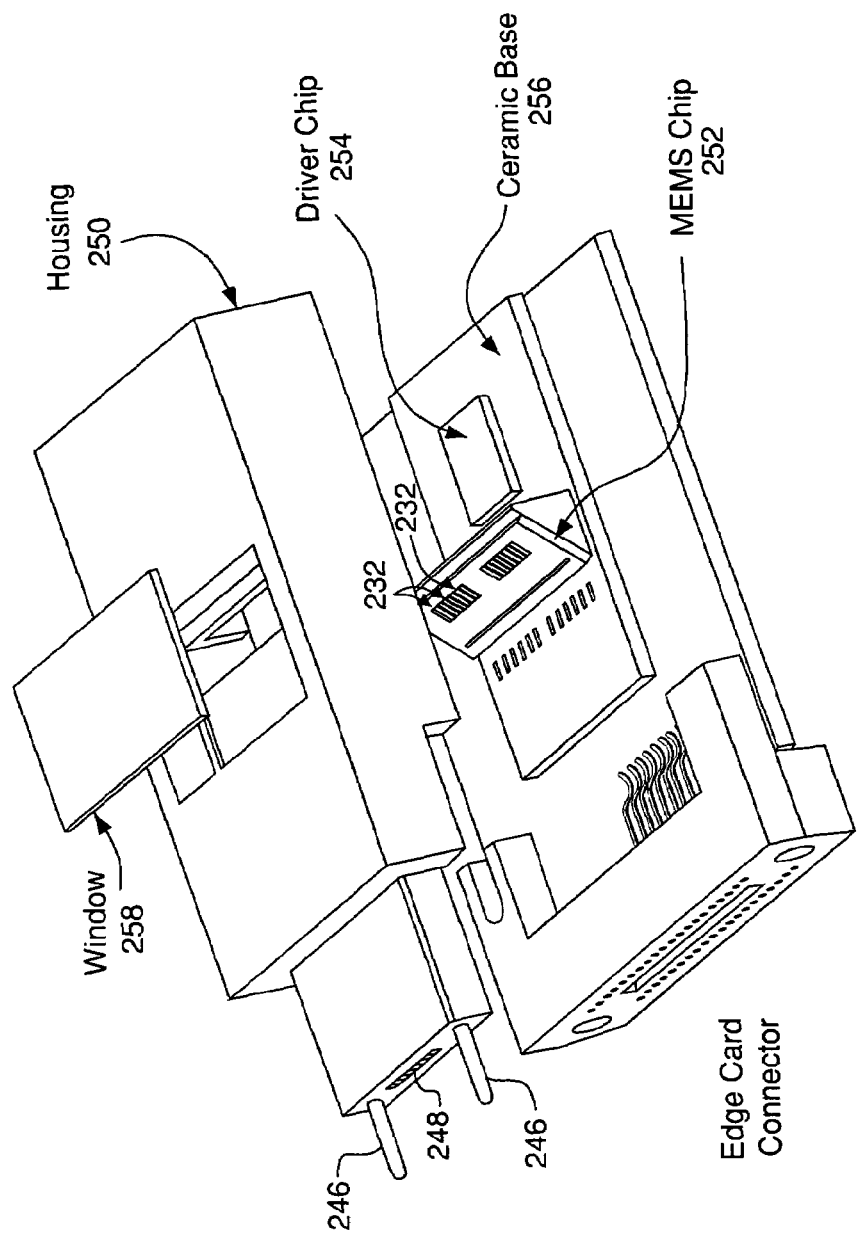

FIGS. 2A–B illustrate a circuit pack 212 and a coupler assembly 226 that can be used for each circuit pack 112 and coupler assembly 126, respectively, in backplane/circuit-pack assembly 100 according to one embodiment of the present invention. More specifically, FIG. 2A shows a three-dimensional perspective view of coupler assembly 226 in a process of being connected to circuit pack 212, and FIG. 2B shows a three-dimensional exploded perspective view of that coupler assembly.

Referring to FIG. 2A, circuit pack 212 has a PCB 218 with a connector 214, using which the circuit pack can be attached to a backplane (not shown). Connector 214 is similar to each connector 114 (FIG. 1) and provides power and electrical connections to the circuit elements of circuit pack 212. Using an edge card connector 244 and alignment pins 246, coupler assembly 226 is attached to a transceiver 224 mounted on PCB 218. Connector pair 244 provides electrical power and control signals to coupler assembly 226, while pins 246 guide an optical fiber array 248 of the coupler assembly to properly mate with transceiver 224. At the end of array 248 facing movable mirrors 232, coupler assembly 226 has an array of lenses (not visible in FIG. 2A) inside housing 250 analogous to lenses 132 of each coupler assembly 126 (FIG. 1).

Referring to FIG. 2B, coupler assembly 226 has a MEMS chip 252 oriented at about 45-degree angle with respect to a ceramic base 256. In one embodiment, MEMS chip 252 has sixteen individually movable mirrors 232 arranged as illustratively shown in FIG. 2B. One skilled in the art will appreciate that a different MEMS chip having a different number of movable mirrors may similarly be used. Light enters and exits coupler assembly 226 through an optical window 258 in housing 250. For example, when circuit pack 212 is attached to backplane 102 (FIG. 1), light from optical pipe 104 enters coupler assembly 226 through window 258, reflects off a mirror 232, and is coupled into a corresponding optical fiber of array 248. Similarly, light emitted from an optical fiber of array 248 reflects off a mirror 232, exits coupler assembly 226 through window 258, and is coupled into optical pipe 104. A driver chip 254 provides driving voltages used in MEMS chip 252 to appropriately and individually tilt mirrors 232. A representative MEMS chip suitable for use in coupler assembly 226 is disclosed in U.S. patent application Ser. No. 10/261,089, filed on Sep. 30, 2002 and entitled "Monolithic MEMS Devices for Optical Switches," the teachings of which are incorporated herein by reference.

Figure 3:
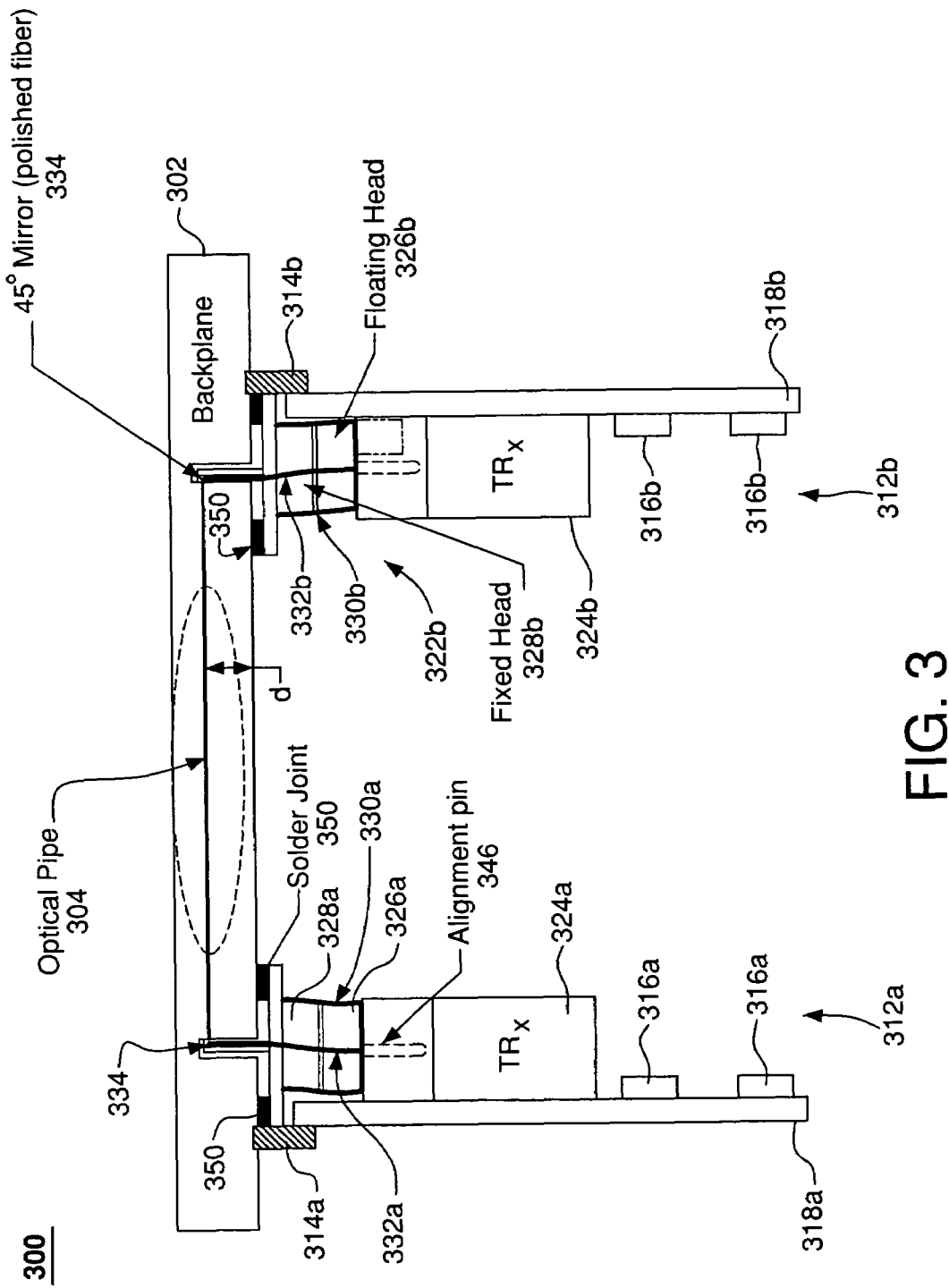
FIG. 3 shows a cross-sectional view of a backplane/circuit-pack assembly according to another embodiment of the present invention.

FIG. 3 shows a cross-sectional view of a backplane/circuit pack assembly 300 according to another embodiment of the present invention. Assembly 300 is analogous to assembly 100 (FIG. 1) and has a backplane 302 having an optical pipe 304 adapted to transmit optical signals. In one embodiment, optical pipe 304 is an array of buried waveguides located at depth d from an outer surface of backplane 302. Backplane 302 supports two circuit packs 312a–b, which are similar to circuit packs 112a–b of assembly 100. More specifically, each circuit pack 312 has a PCB 318, circuit elements 316 mounted on the PCB, and a connector 314, which provides power and electrical connections to the circuit elements. To transmit and receive optical signals through optical pipe 304, each circuit pack 312 has an optical transceiver 324 similar to corresponding transceiver 124 of FIG. 1.

To couple transceiver 324 to optical pipe 304, backplane/circuit-pack 300 has a coupler assembly 322 comprising heads 326 and 328. Head 326 is displaced with respect to head 328 when a flexure 330 connecting said heads is deformed. Coupler assembly 322 has an array of optical fibers 332, each adapted to couple a waveguide of optical pipe 304 to transceiver 324. Fibers 332 are flexible and are bent when head 326 moves with respect to head 328. Each fiber 332 extends from an edge of assembly 322 by length d. The end of this extension has an angled surface oriented at about 45 degrees with respect to the fiber axis. A reflective layer (e.g., metal) deposited onto the angled surface forms a turning mirror, which couples light in and out of fiber 332 while changing the light propagation direction by about 90 degrees. When inserted into a slot in backplane 302, the angled fiber end lines up with a corresponding waveguide of optical pipe 304 as shown in FIG. 3. The other end of each fiber 332 can be mated, using alignment pins 346 that are similar to alignment pins 246 (FIG. 2), with transceiver 324.

Circuit pack 312 can be attached to backplane 302, for example, as follows. First, head 328 is fixedly attached to backplane 302 such that mirrors 334 of fibers 332 are aligned with the corresponding waveguides of optical pipe 304 to provide efficient light coupling between the fibers and waveguides. In one embodiment, head 328 is affixed to backplane 302 using one or more solder joints 350 as shown in FIG. 3. Second, alignment pins 346 of floating head 326 are partially inserted into the matching holes in the housing of transceiver 324. Then, flexure 330 is flexed to align connector 314 with the matching connector part (connector receptacle) on backplane 302. Finally, circuit pack 312 is pushed toward backplane 302 to fully insert alignment pins 346 into transceiver 324 and secure connector 314 in the connector receptacle to arrive at the assembly structure shown in FIG. 3. In backplane/circuit-pack assembly 300, flexure 330 will typically be in a deformed state to accommodate a typically present mismatch between the positions of (1) transceiver 324 and connector 314 in circuit pack 312 and (2) the matching elements of coupler assembly 322 and backplane 302. Advantageously, coupler assembly 322 allows circuit pack 312 to be mounted on backplane 302 in a relatively simple and straightforward fashion while providing efficient optical coupling.

Figure 4A:
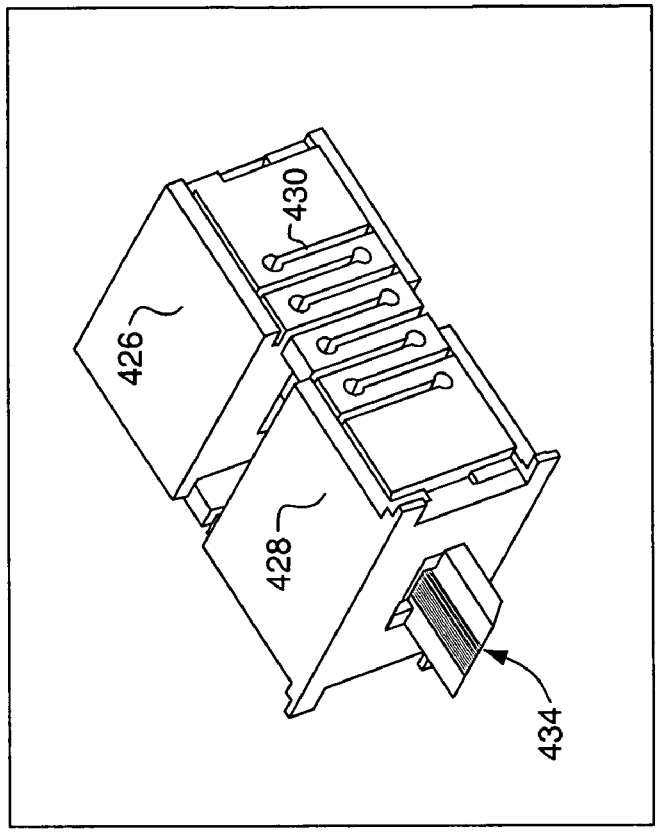
FIGS. 4A–C show three-dimensional perspective views a coupler assembly that can be used in the backplane/circuit-pack assembly of FIG. 3 according to one embodiment of the present invention.
Figure 4B:
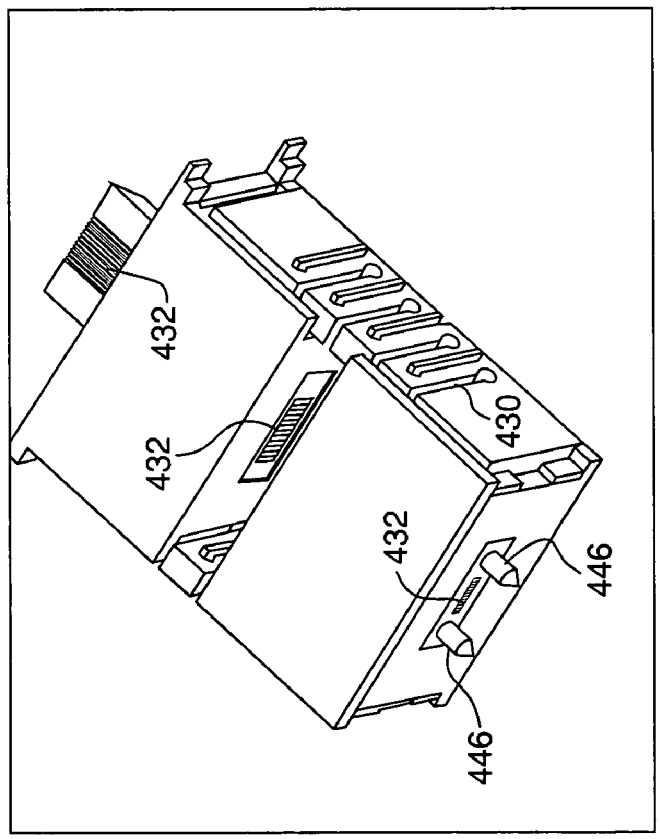
Figure 4C:
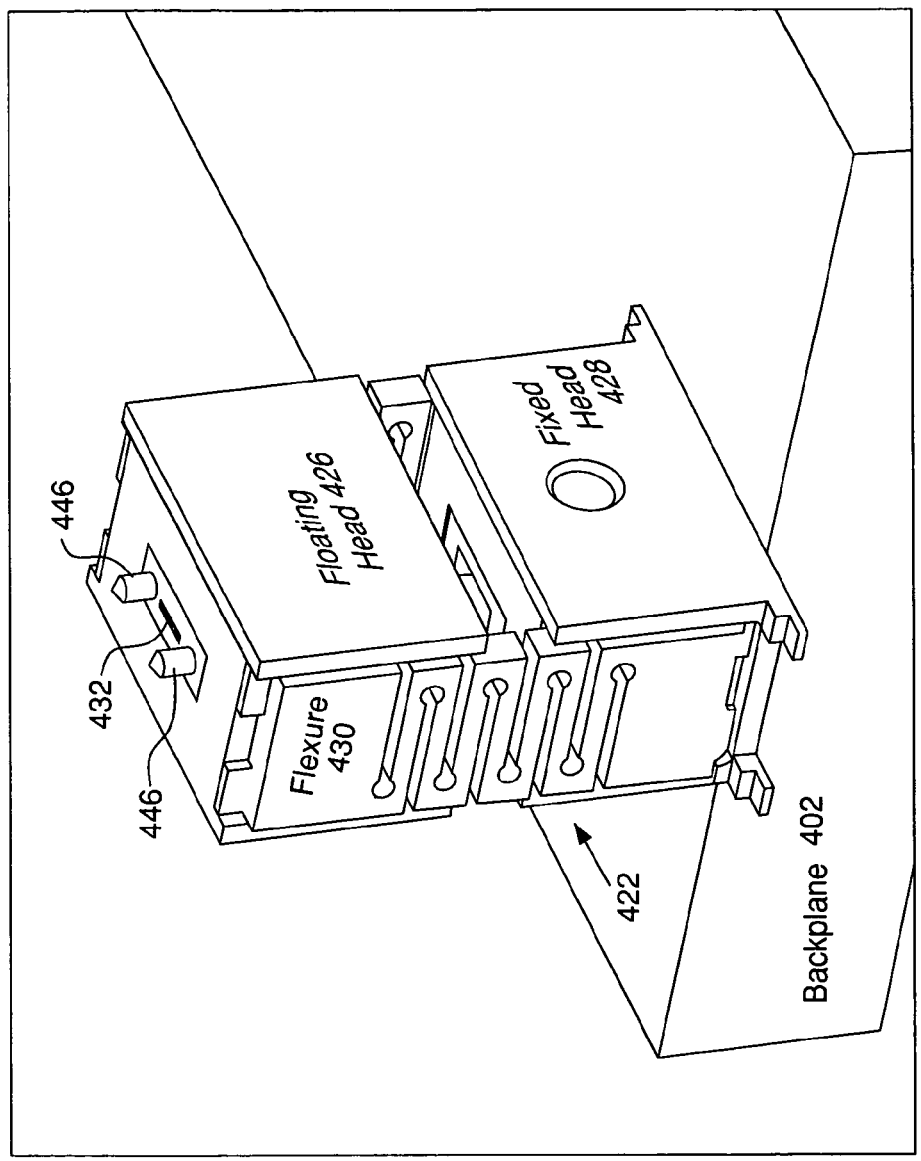

FIGS. 4A–C illustrate a coupler assembly 422 that can be used as coupler assembly 322 in assembly 300 according to one embodiment of the present invention. More specifically, FIGS. 4A–B show two three-dimensional perspective views of coupler assembly 422, and FIG. 4C shows a three-dimensional perspective view of coupler assembly 422 mounted on a backplane 402. A flexure 430 that connects heads 426 and 428 in assembly 422 is a serpentine spring that can accommodate lateral head displacements. Fibers 432 and alignment pins 446 in assembly 422 are similar to fibers 332 and alignment pins 346, respectively, in assembly 322 (FIG. 3). Angled ends 434 of fibers 432 are visible in the view shown in FIG. 4B. A circuit pack similar to circuit pack 312 (FIG. 3) can be attached to coupler assembly 422 and backplane 402 shown in FIG. 4C by inserting alignment pins 446 of floating head 426 into the matching holes in the transceiver housing on that circuit pack, mating the circuit pack and backplane electrical connectors (not shown), and pushing the circuit pack toward backplane 402 to secure both optical and electrical connections.

While this invention has been described with reference to illustrative embodiments, this description is not intended to be construed in a limiting sense. Although the present invention was described in reference to optical pipes comprising optical waveguides, the invention may similarly be practiced with optical pipes implemented using free space optics. Various modifications of the described embodiments, as well as other embodiments of the invention, which are apparent to persons skilled in the art to which the invention pertains are deemed to lie within the principle and scope of the invention as expressed in the following claims.

What is claimed is:

1. A coupler assembly adapted to provide optical coupling between an optical transceiver of a circuit pack connected to a backplane and an optical pipe of said backplane, the coupler assembly comprising a movable optical element, wherein:

the optical pipe is adapted to transmit optical signals through the backplane;

the movable optical element has a flexible optical fiber adapted to guide light between the optical transceiver and the optical pipe and is adapted to move so as to accommodate misalignment between the backplane and the circuit pack to provide said optical coupling; and the coupler assembly has first and second heads connected by a flexure and adapted to move with respect to each other, wherein, when the first head moves with respect to the second head, the flexible optical fiber is bent.

2. The coupler assembly of claim 1, wherein said optical fiber has a fiber end having an angled surface adapted to couple light in and out of said optical fiber while changing the light propagation direction.

3. The coupler assembly of claim 2, wherein the angled surface is oriented at about 45 degrees with respect to a fiber axis.

4. The coupler assembly of claim 1, wherein:

the optical transceiver is adapted to process two or more optical signals;

the optical pipe has two or more waveguides adapted to transmit the two or more optical signals; and the movable optical element comprises two or more flexible optical fibers, each fiber adapted to guide an optical signal between the optical transceiver and a corresponding waveguide.

5. A system, comprising:

a backplane having an optical pipe adapted to transmit optical signals through the backplane; and a coupler assembly adapted to optically couple (i) an optical transceiver of a circuit pack coupled to the backplane and (ii) the optical pipe, wherein the coupler assembly has a movable optical element adapted to accommodate misalignment between the backplane and the circuit pack to provide said optical coupling, wherein:

the movable optical element has a flexible optical fiber adapted to guide light between the optical transceiver and the optical pipe; and the coupler assembly has first and second heads connected by a flexure and adapted to move with respect to each other, wherein, when the first head moves with respect to the second head, the flexible optical fiber is bent.

6. The system of claim 5, wherein said optical fiber has a fiber end having an angled surface adapted to couple light in and out of said optical fiber while changing the light propagation direction.

7. The system of claim 6, wherein the angled surface is oriented at about 45 degrees with respect to a fiber axis.

8. The system of claim 5, wherein:

the optical transceiver is adapted to process two or more optical signals;

the optical pipe has two or more waveguides adapted to transmit the two or more optical signals; and the movable optical element comprises two or more flexible optical fibers, each fiber adapted to guide an optical signal between the optical transceiver and a corresponding waveguide.

* * * * *